United States Patent [19]
Yoshida et al.

[11] Patent Number: 5,716,155
[45] Date of Patent: Feb. 10, 1998

[54] T-SHAPED CONNECTION FRAME

[75] Inventors: Suguru Yoshida; Kohki Sugawara; Masakazu Sato, all of Wako; Mituo Tuge; Harumichi Hino, both of Shizuoka-ken; Keiichi Sugiyama, Tokyo; Shigeru Kohmura, Shizuoka-ken, all of Japan

[73] Assignees: Honda Giken Kogyo Kabushiki Kaisha; Nippon Light Metal Co., Ltd., both of Japan

[21] Appl. No.: 306,478

[22] Filed: Sep. 15, 1994

[30] Foreign Application Priority Data

Sep. 16, 1993 [JP] Japan ................. 5-229879
Sep. 16, 1993 [JP] Japan ................. 5-229880

[51] Int. Cl.⁶ ........................... B21D 39/00
[52] U.S. Cl. .............. 403/187; 403/192; 403/232.1; 403/237; 403/257; 403/326
[58] Field of Search ................ 403/187, 231, 403/232.1, 233, 234, 237, 257, 192, 199, 326; 24/683, 684, 685, 587

[56] References Cited

U.S. PATENT DOCUMENTS

| | | | |
|---|---|---|---|
| 1,637,090 | 7/1927 | Rumble | 403/326 X |
| 2,065,325 | 12/1936 | Calhoun | 403/326 X |
| 2,189,865 | 2/1940 | Peterson | 403/187 X |
| 2,609,418 | 9/1952 | Binns et al. | 403/187 X |
| 2,688,655 | 9/1954 | Gross | 403/187 X |
| 3,285,428 | 11/1966 | Scheck | 403/326 X |
| 3,369,265 | 2/1968 | Halberstadt et al. | 403/326 X |
| 3,485,519 | 12/1969 | Chak-Fai Chiu | 403/187 X |
| 3,778,175 | 12/1973 | Zimmer | 403/187 |
| 3,816,011 | 6/1974 | Biebuyck et al. | 403/187 |
| 4,461,596 | 7/1984 | Davidson | 403/187 X |
| 4,572,694 | 2/1986 | Hoeksema | 403/187 |
| 4,892,431 | 1/1990 | Bachmann et al. | 403/187 |
| 5,007,143 | 4/1991 | Herrington | 24/587 X |
| 5,198,055 | 3/1993 | Wirth et al. | 24/587 X |
| 5,224,307 | 7/1993 | Lukos | 403/187 X |
| 5,271,687 | 12/1993 | Holka et al. | 403/237 X |
| 5,276,950 | 1/1994 | Johnson | 24/587 |

FOREIGN PATENT DOCUMENTS

| | | | |
|---|---|---|---|
| 595874 | 4/1934 | Germany | 24/587 |
| 13747 | 8/1956 | Germany | 403/187 |
| 1953287 | 4/1971 | Germany | 403/187 |
| 1314878 | 4/1973 | United Kingdom | 403/187 |
| 2052003 | 1/1981 | United Kingdom | 403/187 |

*Primary Examiner*—Eric K. Nicholson
*Assistant Examiner*—Christopher J. Novosad
*Attorney, Agent, or Firm*—Venable, Baetjer, Howard & Civiletti, LLP

[57] ABSTRACT

The present invention relates to a T-shaped connection frame for connecting car frames, in which a first member is connected to a second member via a joint member to form a "T." The joint member is formed by symmetrically dividing a rectangular tube between its two latch teeth located at the upper-center and lower-center inner walls. The rectangular tube also has protrusions at the left and right exterior walls. The joint member divided in this way has the latch teeth at the upper and lower tips of the mouth formed by the division and has the protrusion situated opposite the mouth so that the first member can be snapped on easily to this mouth and the second member can be attached to the protrusion at the opposite side. This structural arrangement makes the positioning of the frames very simple, obviates a make-shift attachment, and, at the same time, reduces the number of operation steps.

9 Claims, 11 Drawing Sheets

T-SHAPED CONNECTION FRAME

BACKGROUND OF THE INVENTION

1. Field of the Invention

This invention relates to a connecting structure for car frames, and more particularly to a T-shaped connection frame in which a first member is connected to a second member via a joint member whereby the whole structure serves as a means for connecting car frames.

2. Description of the Prior Art

The recent trend has been to construct the frames of cars, motorcycles, and other vehicles out of aluminum or aluminum alloy, and a particular attention has been directed to making these frames lighter. Ordinarily, in regard to an automobile frame, the roof pillar, which is a rail frame that runs from the front side door to the back side door above the windows of these side doors, and the front roof rail, which is a rail frame that runs across the roof above the front window; or the roof pillar and the rear roof rail, which is a rail frame that runs across the roof above the rear window, are connected together via a joining element by the conventional methods of welding, bolting, brazing, or gluing. Similarly, the roof pillar and the center pillar, which is a pillar frame that is situated between the front side door and the back side door; or the center pillar and the side sill, which is a frame that runs just below the front side door and the back side door, are also connected together at each junction by one of the methods cited above.

For instance, a joining element is first welded (or bolted, brazed, etc.) to the side roof rail and then connected to the front roof rail or, in another case, the rear roof rail; alternatively, the joining element is first welded (or bolted, brazed, etc.) to the front roof rail or the rear roof rail and then connected to the side roof rail. Another method requires that the side roof rail be divided at the connecting junction such that the frames are connected in three parts. These manufacturing processes suffer from a difficulty of welding (or bolting, etc.) at the correct position such that a make-shift attachment is required at the junction, and the overall effect is to increase the number of operation steps.

The purpose of the present invention is to solve the problems as mentioned above by providing a first member that can be easily connected to a second member via a joint member in a form of "T" and by providing a method for manufacturing the joint member that connects the second member to the first member.

SUMMARY OF THE INVENTION

In view of the aforementioned problem regarding the positioning of the weld in car frames, the object of the present invention is to provide a T-shaped connection frame. Specifically, one object of the present invention is to provide a T-shaped connection frame which comprises a first member having at least two engaging portions, a joint member having snap-on means for engaging to the engaging portions to connect to the first member and at least one linking portion, and a second member which is joined to the joint member by attaching at the linking portion whereby the second member abuts the first member via the joint member to form a T. The present invention facilitates the positioning and connecting of car frames such that a make-shift attachment is obviated, thereby effectively reducing the number of manufacturing steps required in connecting the frames.

Another object of the present invention is to provide a T-shaped connection frame in which the engaging portions of the first member and the snap-on means of the joint member are engaged in a line such that the joint member can tightly grip the first member.

Further object of the present invention is to provide a T-shaped connection frame in which the snap-on means of the joint member is a mouth with a first latch tooth disposed at the upper end of the mouth in one continuous line and with a second latch tooth disposed at the lower end of the mouth in one continuous line, and the engaging portions of the first member are a first groove and a second groove such that the first latch tooth and second latch tooth of the mouth snap on correspondingly to the first and second grooves of the first member for facilitating the connection between the first member and the joint member.

Still further object of the present invention is to provide a T-shaped connection frame in which the first member is a four-sided pipe with the first groove disposed along the length of the four-sided pipe on one of the sides of the four-sided pipe and with the second groove disposed along the length of the four-sided pipe at opposite the side of the first groove. The side of the second groove is constructed to tilt toward the side of the first groove. The mouth of the joint member has the first latch tooth disposed at the inner end of the upper plate of the mouth to snap on to the first groove and has the second latch tooth disposed at the end of a fixed jaw formed below the upper plate of the mouth to snap on to the second groove. A slot with a protrusion at the center of the slot is formed opposite the mouth of the joint member for sliding the joint member to the second member, which is a tube with right and left fins; the protrusion fits into the inner diameter of the second member; and the fight and left fins rest respectively on right and left panels formed in the slot for stabilizing the connection.

Still further object of the present invention is to provide a T-shaped connection frame in which the first groove has a rounded bottom and the first latch tooth has a round contour to fit in the first groove such that the joint member can rotate about the first latch tooth placed in the first groove to latch the second latch tooth on to the second groove. This facilitates the connection process of the joint member to the first member.

Still further object of the present invention is to provide a T-shaped connection frame in which each of the connection of the joint member is welded or connected by an adhesive agent for further reinforcing the joints.

Still further object of the present invention is to provide a method of constructing a joint member, which connects to the first member and to the second member to form a T-shaped connection frame. The method comprises the steps of forming by the extrusion process a rectangular tube with two lines of latch teeth symmetrically disposed at the upper and lower interior walls; forming linking portions at the right and left exterior walls of the rectangular tube for linking to the second member; and dividing the rectangular tube symmetrically into two between the two lines of latch teeth along the length of the rectangular tube such that the cross-sectional view forms an open-ended square. The method makes it possible to construct two joint members simultaneously.

For a more complete understanding of the present invention and the advantageous features thereof, reference is now made to the following Detailed Description of Preferred Embodiments of the Invention in conjunction with the accompanying Drawings.

DESCRIPTION OF THE PREFERRED EMBODIMENTS

Figure 1A:
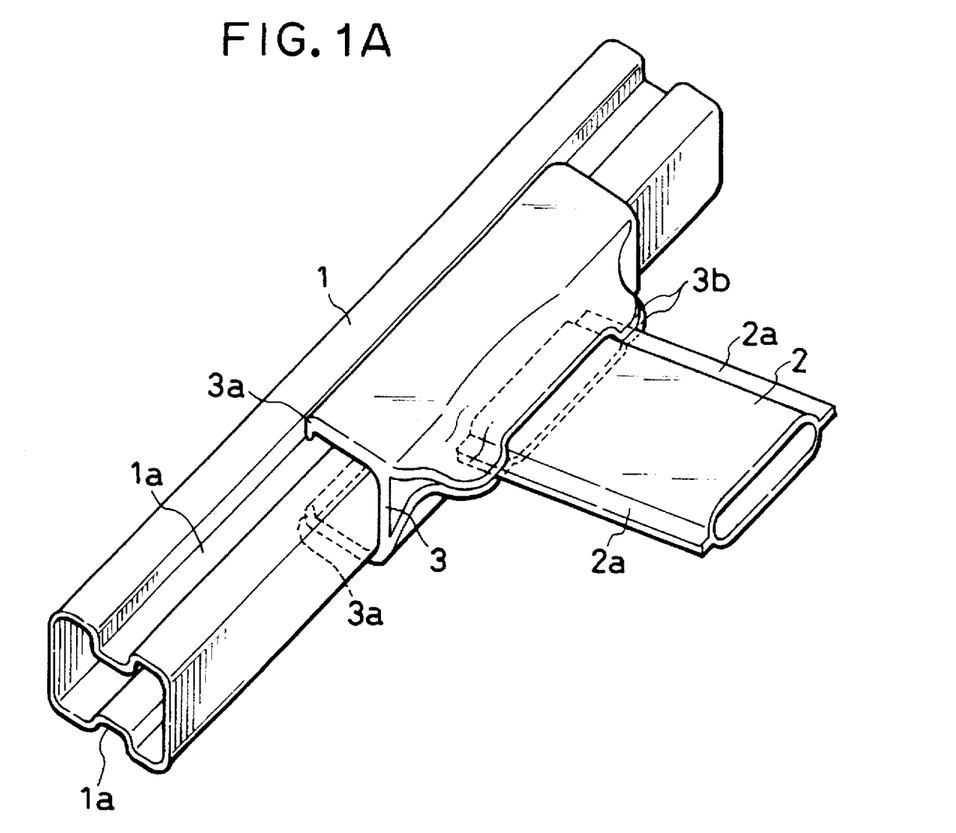
FIG. 1A is a perspective view of a T-shaped connection frame according to the first embodiment of the present invention.
Figure 1B:
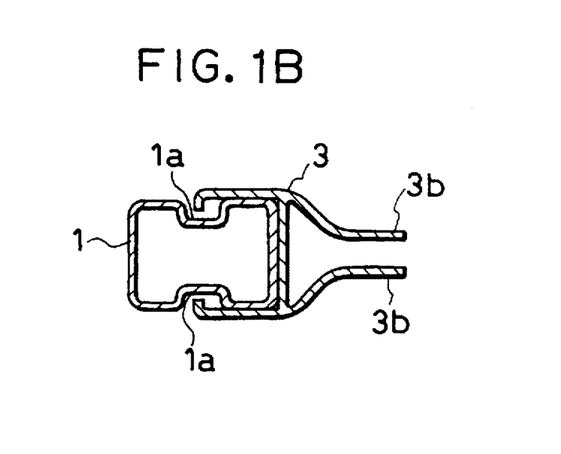
FIG. 1B is a cross-sectional view of a part of a T-shaped connection frame according to the first embodiment of the present invention.
Figure 2:
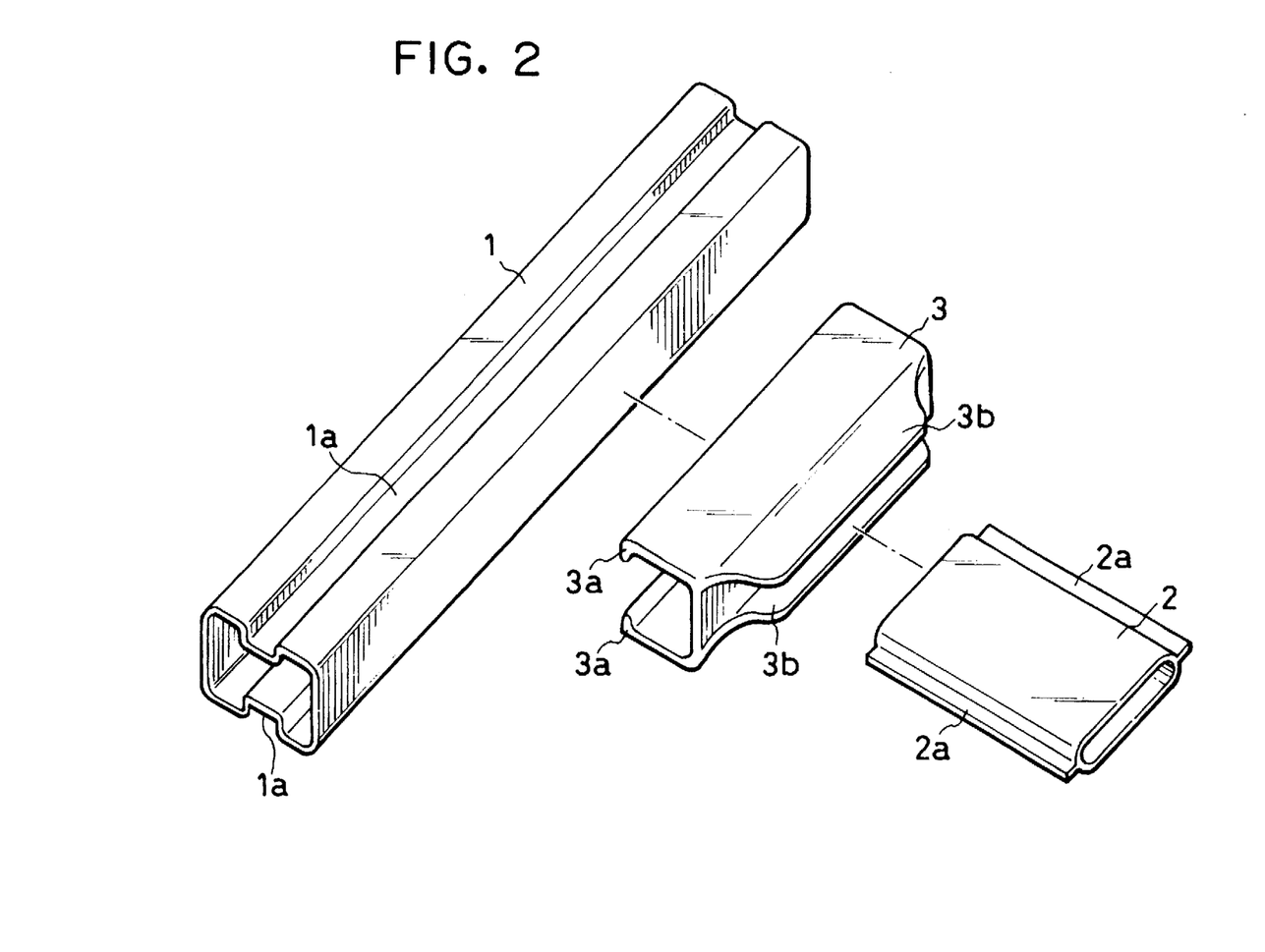
FIG. 2 is an exploded perspective view of the frame shown in FIG. 1A.

FIGS. 1A and 1B show respectively a perspective view and a cross-sectional view of a T-shaped connection frame according to the first embodiment of the present invention, and FIG. 2 shows an exploded view of this frame. It should be noted that the present invention is not necessarily restricted to the form of "T" in that the second member need only to abut the first member. The form could just as well be Y-shaped or something of a more complicated shape. Reference numeral 1 indicates the first member of a T-shaped connection frame that is a part of, for instance, the side roof rail of a car frame; 2 designates the second member of the T-shaped connection frame that may be a part of the center pillar of a car frame. The first member 1 and the second member 2 are connected via a joint member 3 to form a "T."

The first member 1 and the second member 2 are formed from an extruded shaped material of aluminum or aluminum alloy. The joint member 3 is made by press forming a die cast material or an extruded shaped material; also, as explained later, the same member may be made by dividing the extruded shaped material by the bulge formation process. The first member 1 is formed from a hollow material which has on the upper and lower surfaces grooves 1a for engaging the joint member 3. The cross-section of the joint member 3 is a square that has one side missing. The joint member 3 has flanges 3b attached in parallel on the side opposite the open-ended side for connecting to the second member 2 and has latch teeth 3a at the tips of the open-ended side for engaging the first member 1. The second member 2 is a flattened tube with fins 2a at the left and right hand sides.

In order to connect the first member 1 and the second member 2 via the joint member 3, as shown in FIG. 2, the second member 2 is placed between the flanges 3b and clamped tight at the right and left sides, and then, as shown in FIG. 1A, the connection is reinforced as necessary by the method of resistance welding, MIG welding, TIG welding, or laser welding. Following this, as shown in FIG. 2, the joint member 3 with the second member 2 now attached is snapped on to the first member 1 by engaging the latch teeth 3a with the grooves 1a of the first member 1. This connection is glued as necessary. The connection may be further reinforced by the method of MIG welding, TIG welding, or laser welding.

Figure 3:
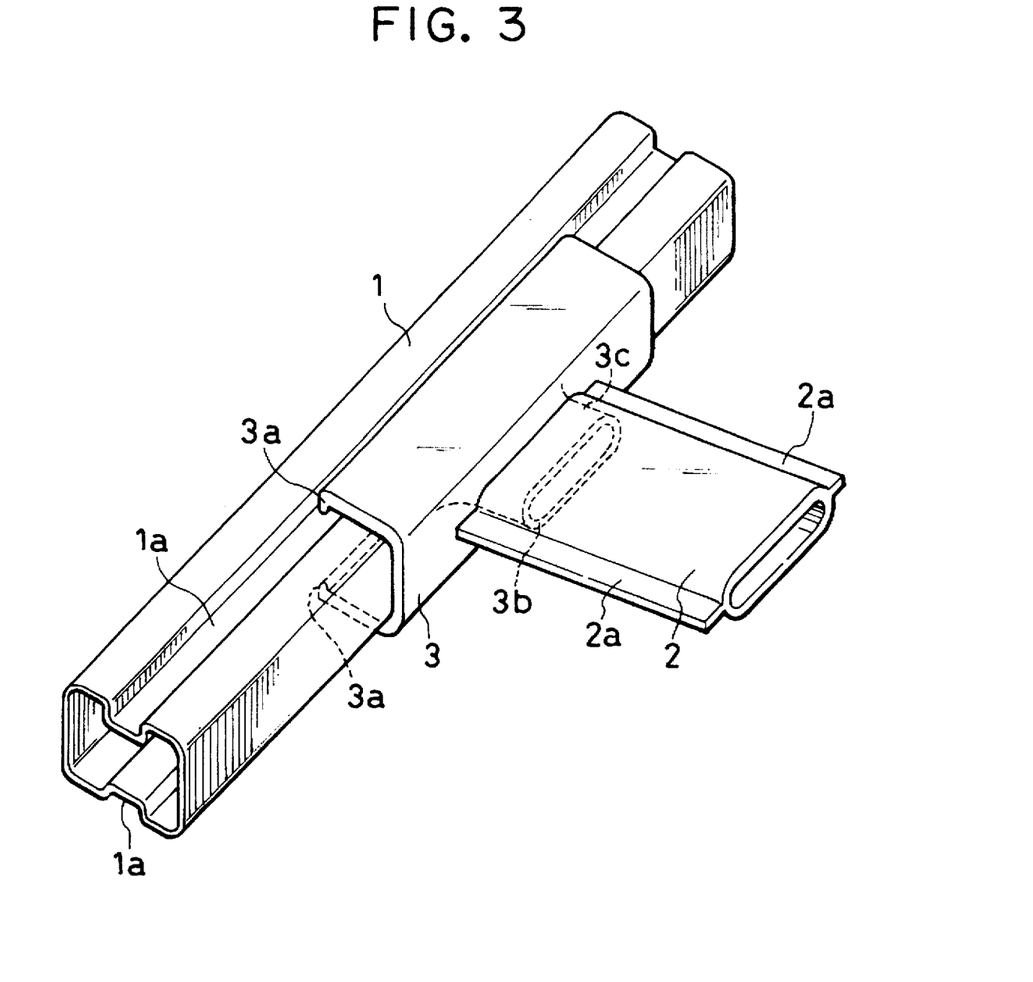
FIG. 3 is a perspective view of a T-shaped connection frame according to the second embodiment of the present invention.
Figure 4:
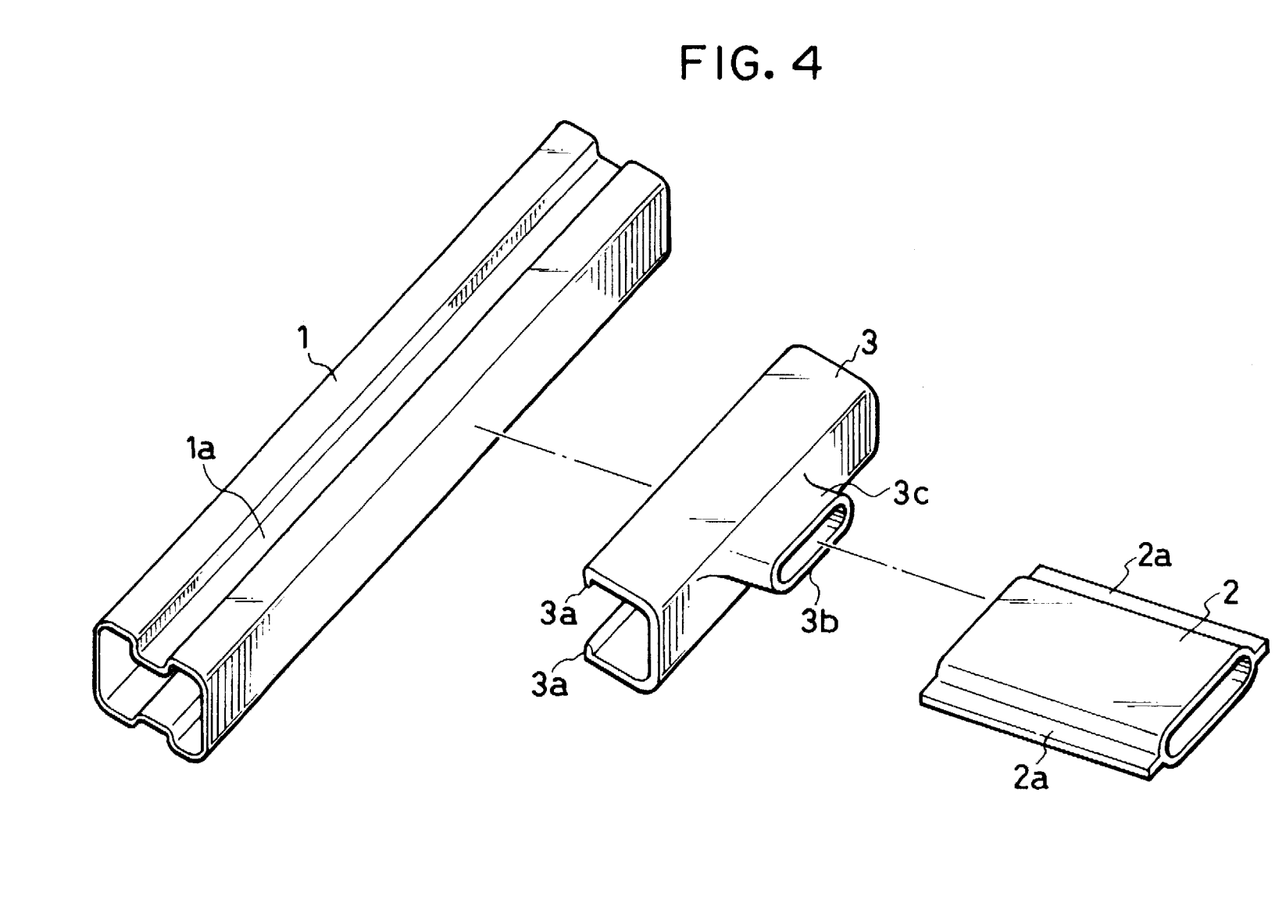
FIG. 4 is an exploded perspective view of the frame shown in FIG. 3.

FIG. 3 shows a perspective view of a T-shaped connection frame according to the second embodiment of the present invention, and FIG. 4 shows an exploded view of this frame. Unless noted otherwise, the reference numbers in these figures are the same as those in FIGS. 1 and 2. The joint member 3 has a protrusion 3c at its back central portion with a smaller circumference than the inner circumference of the second member 2 and has a connecting part 3b that connects to the second member 2. In order to connect the first member 1 and the second member 2 via the joint member 3, as shown in FIG. 4, the second member 2 is placed in the connecting part 3b and glued as needed, and then, as shown in FIG. 3, the connection is reinforced as necessary by the method of resistance welding, MIG welding, TIG welding, or laser welding. Following this, as shown in FIG. 4, the joint member 3 with the second member 2 now attached is snapped on to the first member 1 by engaging the latch teeth 3a with the grooves 1a of the first member 1. This connection may be reinforced as necessary by welding.

Figure 5:
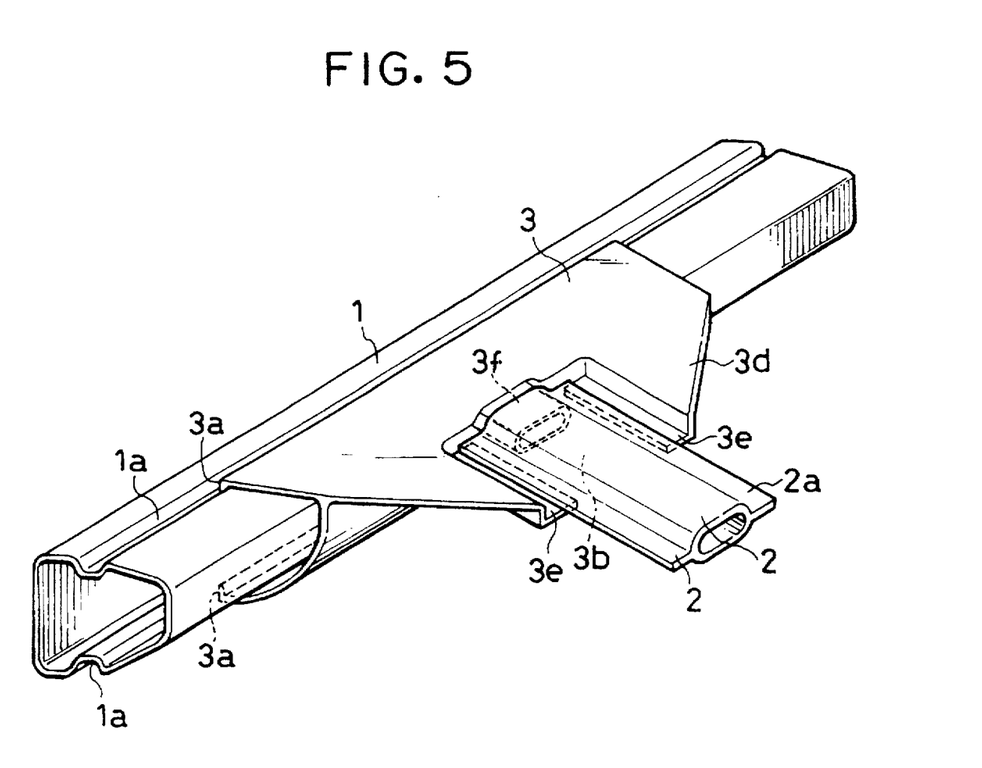
FIG. 5 is a perspective view of a T-shaped connection frame according to the third embodiment of the present invention.
Figure 6:
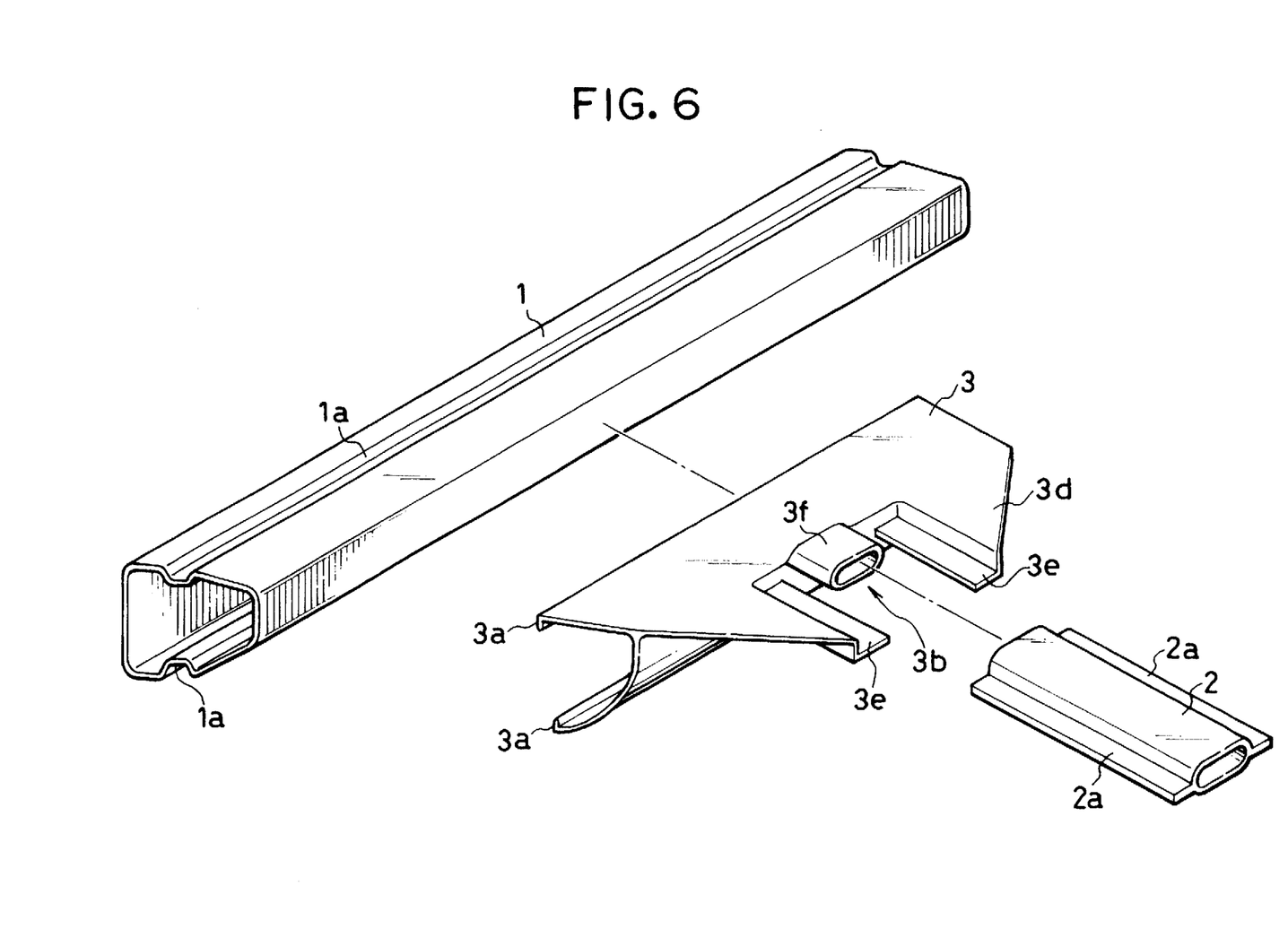
FIG. 6 is an exploded perspective view of the frame shown in FIG. 5.

FIG. 5 shows a perspective view of a T-shaped connection frame according to the third embodiment of the present invention, and FIG. 6 is an exploded view of the same. Except as noted, the reference number in these figures are the same as those in FIGS. 1 and 2. The joint member 3 has a flat panel 3d protruding at the upper back portion, a slot panel 3e for guiding and holding the fins 2a of the second member 2, a protruding portion 3f at the back center with a circumference smaller than the inner circumference of the second member 2, and a slot (connecting part) 3b for connecting the second member 2. In order to connect the first member 1 and the second member 2 via the joint member 3, as shown in FIG. 6, first the second member 2 is placed in the slot 3b and glued to the slot panel 3e and the protruding portion 3f as needed; then, as shown in FIG. 5, the connection is reinforced as necessary by the method of resistance welding, MIG welding, TIG welding, or laser welding. Following this, as shown in FIG. 6, the joint member 3 with the second member 2 now attached is snapped on to the first member 1 by engaging the latch teeth 3a with the grooves 1a of the first member 1. If necessary, this connection may be reinforced by welding.

Figure 7A:
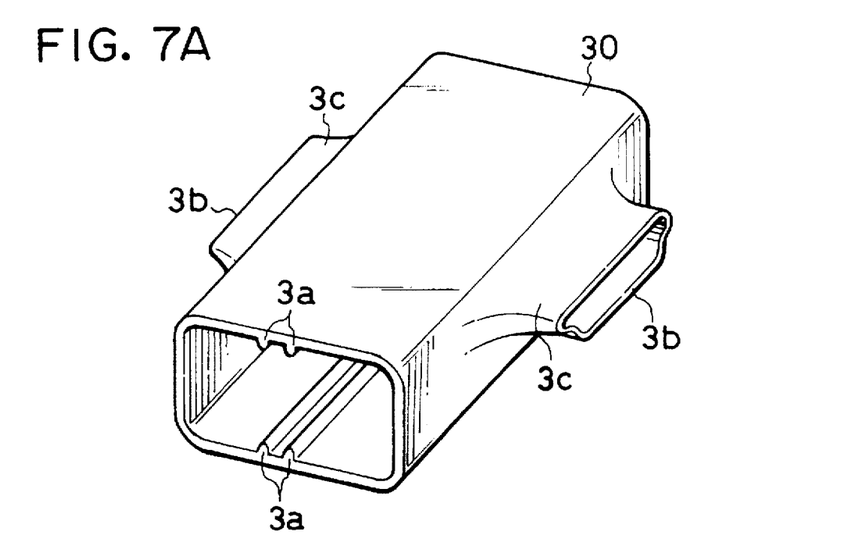
FIG. 7A is a perspective view of a joint member in the T-shaped connection frame of the present invention.
Figure 7B:
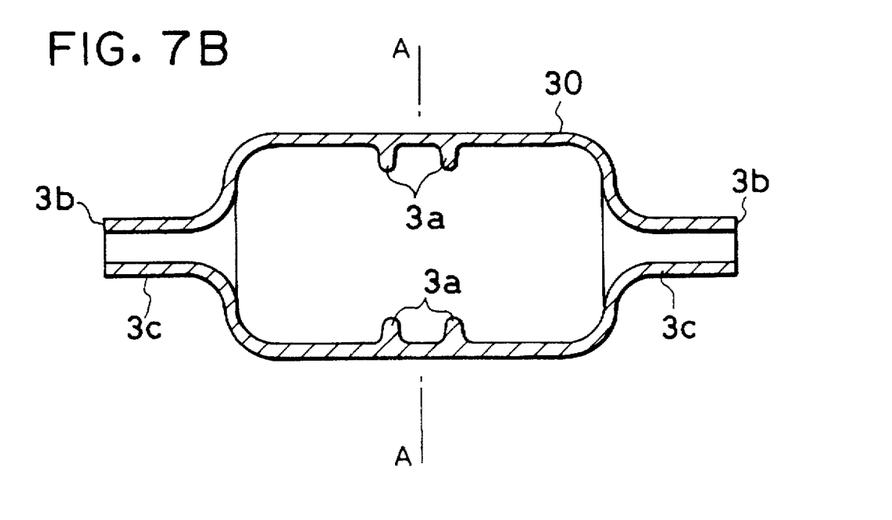
FIG. 7B is a cross-sectional view of a joint member in the T-shaped connection frame of the present invention.
Figure 8:
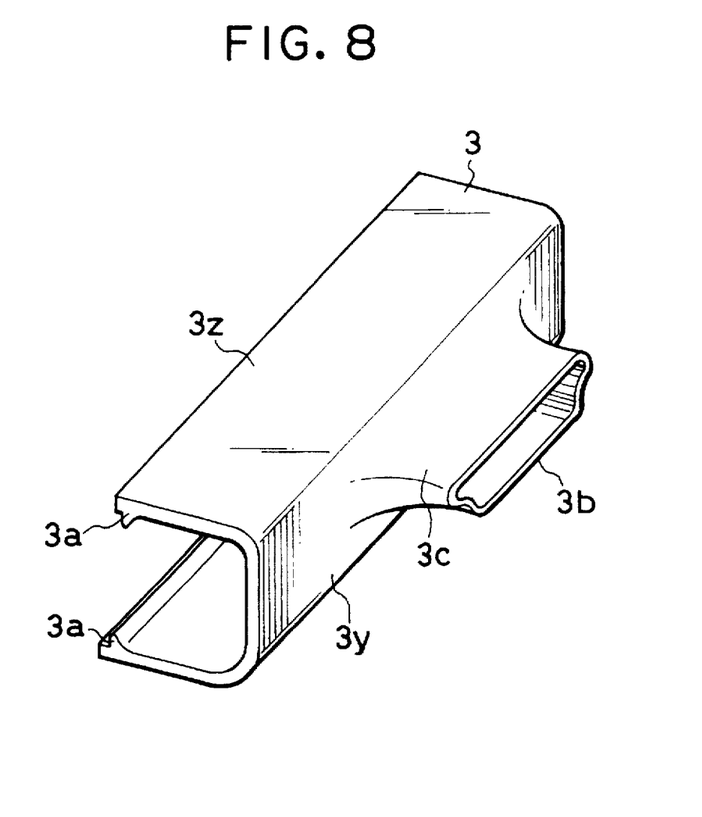
FIG. 8 is a joint member of the present invention.

FIGS. 7A and 7B respectively illustrate a perspective view and a cross-sectional view of a joint member of a T connection frame of the present invention. Made of aluminum or aluminum alloy, an extruded shaped material 30, which is hollow and formed by the extrusion process, has two lines of latch teeth at the upper-center and lower-center interior walls. And at the right and left sides of the extruded shaped material 30, a protrusion 3c each is formed by the bulge or the press formation process, and a connecting part 3b is formed for connecting the second member 2. According to the present invention, the connecting part 3b is formed by slicing off the leading edge of the protrusion after making the protrusion by the bulge formation process. This extrusion shaped material is divided lengthwise along the A—A line as shown in FIG. 7B. This produces two sets of the joint member 3 as shown in FIG. 8 with the latch teeth 3a at the upper and lower tips of the open ended portion and with the connecting part 3b at the back central portion of the joint member 3 for connecting to the second member 2. In the case of the press formation process, the connecting part 3b is formed after dividing at the A—A line.

Figure 9:
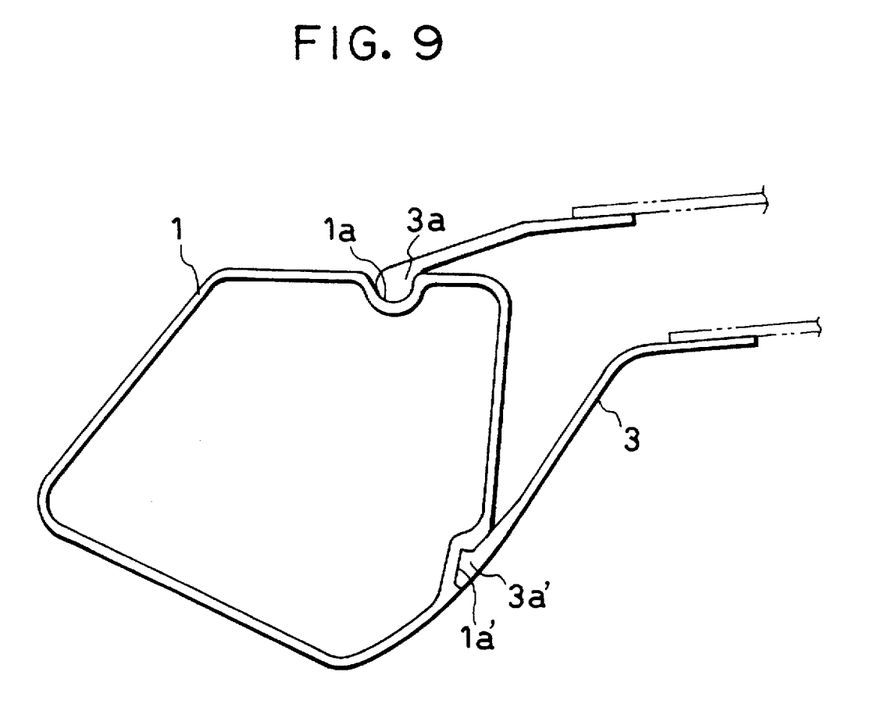
FIG. 9 is a cross-sectional view of an example of the present invention.

The first member 1 and the joint member 3 are made to snap together, and FIG. 9 shows an example of the connection of this type. The upper and lower latch teeth 3a and 3a' having elasticity are snapped on to the grooves 1a and 1a' of the first member 1. The order of connection is that the upper latch tooth 3a is first snapped on to the groove 1a, and then the joint member 3 is rotated about the upper latch tooth 3a to snap the lower latch tooth 3a' on to the groove 1a'.

Figure 10:
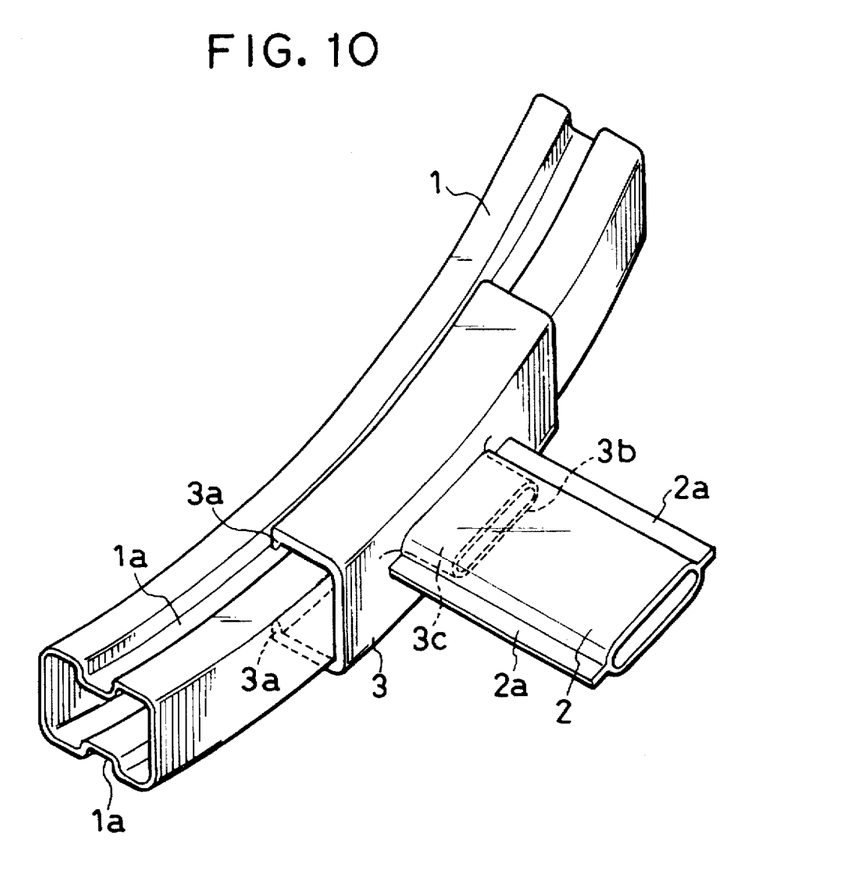
FIG. 10 is another example of the present invention.
Figure 11:
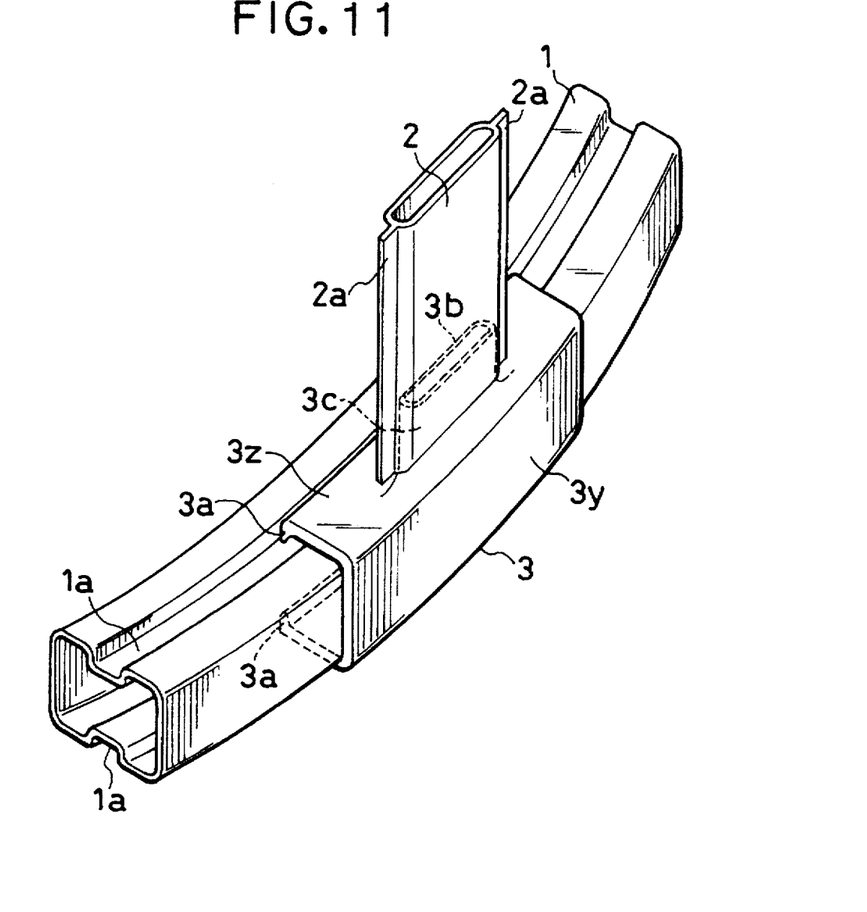
FIG. 11 is still another example of a T-shaped connection frame of the present invention.

FIG. 10 shows an example of an Y-shaped connection frame in which the second member 2 is connected via the joint member 3 to the first member 1 which has a curvature. FIG. 11 illustrates a connection frame in which the second member 2 is connected in a different direction than in the previous embodiments.

In all the previous embodiments, the second member 2 is first connected to the joint member 3 and then the joint member 3 is connected to the first member 1, but the order can be changed such that the first member 1 is connected to the joint member 3 first. In the case of manufacturing a car, the order of connection of the present invention should be dictated by the construction order and the overall structure of the car.

Additionally, in all the previous embodiments, besides the snap-on and the mechanical connections of the first member 1 and the second member 2 to the joint member 3, the optional connection means of gluing or welding are mentioned, but the need for gluing or welding should be determined by the necessary strength of the connection and of the overall structure.

In all the previous embodiments, the first member 1 and the joint member 3 each has a two-part connecting element, but the connecting element may be increased in accordance with the need, or the protrusion and the indentation of the connecting elements may be reversed. Furthermore, the examples are illustrated with car frames of the roof pillar and the center pillar in mind, but the first member 1 can just as well be the side sill and the second member 2, the front roof pillar or the rear roof pillar where the joint member can be utilized.

Additionally, the protrusion 3c and the connecting part 3b of the joint member 3 are formed on the surface 3y as shown in FIG. 8, but the protrusion can be formed on the surface 3z as well. Furthermore, in the case of a first member having a curvature, the joint member formed after dividing across the A—A line can be subjected to a bending process. FIG. 11 illustrates the above-mentioned case and the reference numbers are as explained previously.

The present invention according to the aforementioned embodiments provides a T-shaped connection frame in which a joint member is formed by symmetrically dividing a rectangular tube between its two latch teeth located at the upper-center and lower-center inner walls. The rectangular tube also has protrusions at the left and right exterior walls. The joint member divided in this way has the latch teeth at the tips of the mouth formed by the division and has the protrusion situated opposite the mouth so that the first member can be snapped on easily to this mouth and the second member can be attached to the protrusion at the opposite side. This structural arrangement makes the positioning of the frames very simple and the connection very firm. It also obviates a make-shift attachment, and, at the same time, reduces the number of operation steps.

What is claimed is:

1. A T-shaped connection frame comprising:
    a first member having first and second grooves, wherein said grooves are on opposite surfaces and disposed along the length of said first member; a second member having an end
    a joint member having snap-on means with teeth for snapping on to said grooves of said first member and having a clamping means for clamping down on said second member; and wherein
    the end of said second member fits into said clamping means of said joint member, slides within said clamping means for adjustment, and is joined to said joint member by clamping said clamping means on the end of said second member, and said snap-on means of said joint members snaps on to said first members and slides along the grooves for adjustment, and said second member abuts said first member via said joint member to form a T.

2. The T-shaped connection frame according to claim 1, wherein each connection of said joint member is welded.

3. The T-shaped connection frame according to claim 1, wherein said joint member is formed by die casting.

4. The T-shaped connection frame of claim 1, further comprising:
    a pair of fins on opposite sides of said second member, wherein said clamping means are clamped together to grip the end of said second member including said fins to provide further stability to said T-shaped connection frame.

5. A T-shaped connection frame comprising:
    a first member having first and second surfaces, and first and second grooves located on each of said first and second surfaces respectively, wherein said first surface is constructed to tilt toward said second surface and said second surface is constructed to tilt toward said first surface;
    a joint member having snap-on means consisting of a mouth with an arcuate lower portion and a substantially planar upper portion with teeth that snap on to either of said first or second grooves, and
    wherein said mouth is shaped to fit over the outer contour of said tilted first and second surfaces; a second member is joined to said joint member and said second member abuts the first member via said joint member to form a T.

6. The T-shaped connection frame according to claim 5, wherein said first member is a roof pillar and said second member is a center pillar, and said first member and said second member together with said joint member serve as a means for connecting automobile frames.

7. A T-shaped connection frame comprising:
    a first member having first and second surfaces, and first and second grooves located on each of said first and second surfaces respectively, wherein said first surface is constructed to tilt toward said second surface and said second surface is constructed to tilt toward said first surface;
    a joint member having snap-on means consisting of a mouth with teeth that snap on to either of said first or second grooves, and wherein said mouth is shaped to fit the contour of said tilted first and second surfaces;
    a second member which is joined to said joint member whereby said second member abuts the first member via said joint member to form a T;
    said joint member further comprises a slot opposite said snap-on means, with a protrusion at the center of said slot and left and right panels formed in said slot; and
    said second member is a tube having left and right fins; wherein said protrusion fits into the inner diameter of said second member, and said right and left fins rest on said right and left panels, respectively, for stabilizing the connection frame.

8. A T-shaped connection frame comprising:

a first member having first and second grooves on its surface, wherein said grooves are on adjacent surfaces and disposed along the length of said first member; a second member a joint member having snap-on means comprised of a mouth having upper and lower plates, with a first latch tooth downwardly extending from the end of said upper plate in one continuous line, and with a second latch tooth upwardly extending from the end of said bottom plate in one continuous line, such that said first latch tooth and said second latch tooth snap on to said first and said second grooves respectively, and wherein said first groove has a rounded bottom and said first latch tooth has a round contour to fit in said first groove, and said joint member is rotated over said first member and about said first latch tooth placed in said first groove to latch on said second latch tooth to said second groove for facilitating the connection between said first member and a said second member; and said second member is joined to said joint member and said second member abuts said first member via said joint member to form a T.

9. The T-shaped connection frame according to claim 8, wherein said first member and said second member are formed from an extruded shaped material of aluminum alloy.

* * * * *